United States Patent Office 3,557,418
Patented Jan. 26, 1971

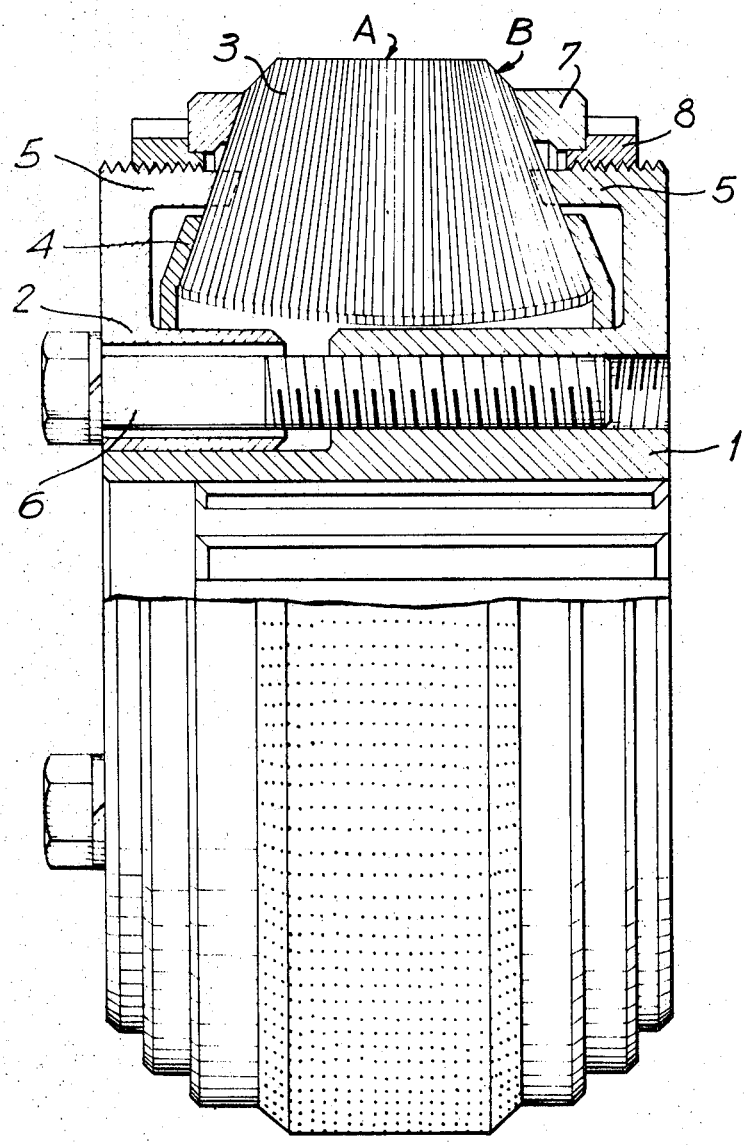

3,557,418
ROTATING CUTTING TOOL FOR SURFACE MA-
CHINING OF ARTICLES AND MATERIALS
Viktor Samsonovich Salukvadze, 5 Parkovaya ul. 42,
kv. 53, Moscow, U.S.S.R.
Filed Sept. 20, 1968, Ser. No. 761,249
Int. Cl. B23d 71/00; B26d 1/12
U.S. Cl. 29—105                                    5 Claims

ABSTRACT OF THE DISCLOSURE

A rotatable cutting tool comprises cutters formed by pieces of wire fastened together at one of the ends thereof while their other free ends form the working surface of the tool in the shape of a surface of revolution. The side surfaces of the wire pieces are pressed against each other at their fastened ends while along their remaining length the wire pieces are compressed laterally by rings in the form of a truncated cone at the side facing the wires such that the ratio of the sum of the face areas of the cutting tips of the wire to the entire area of the working surface is between 0.10 and 0.93.

---

This invention relates to rotating cutting tools for surface machining of articles and materials.

Most successfully this invention can be utilized for the removal of scale and rust from hot-rolled products, for ensuring the required degree of surface roughness, and for making micropowders.

Widely known in the art are rotating cutting tools for surface machining of articles and materials, such as abrasive wheels and belts which are, however, short-lived which hampers the automation of the machining processes. While handling ductile materials these tools become soiled, produce burns on the surface being machined, contaminate the cut chips with abrasive dust, thus hampering their reuse, and contaminate the ambient air with dust bringing harm to the working personnel.

Also known are rotating tools in the shape of wire brushes, in which pieces of wire are used as cutters, said pieces forming at one end a working surface of the tool in the shape of a surface of revolution while the other ends of these wire pieces are fastened to one another. These tools are characterized by low productivity and short service life. If the working surface of these tools is lightly pressed against the machined surface, the ends of the wire pieces slide over the latter; conversely, if a considerable pressure is applied, the pieces of wire become destroyed due to fatigue stresses. Moreover, these tools cannot produce a required surface roughness of the machined article or material.

An object of the present invention resides in providing a rotating cutting tool for surface machining of articles and materials which, together with a higher productivity and a longer service life, as compared with the existing tools of this type, ensure removal of the surface layers of material of any plasticity, and surface machining of the articles with a required degree of roughness.

This object is achieved by the use of a rotating cutting tool for surface machining of articles and materials in which the role of the cutters is fulfilled by pieces of wire fastened together at one end, while their other free ends form the working surface of the tool in the shape of a surface of revolution. According to the invention, the side surfaces of the wire pieces are pressed together tightly at the ends fastened to one another while along the remaining length the wire pieces are compressed laterally so that the relation between the sum of the areas of the free cutting tip faces of the wire pieces and the entire working surface of the tool equals 0.10–0.93.

It is preferred to compress the set of wire pieces laterally by means of rings located at the sides of the wire set and shaped like a truncated cone at the side of the wires.

Furthermore, it is preferred to compress laterally the wire pieces additionally by two pairs of rings of different diameters installed with provision for bringing them closer to each other with a view to adjusting the degree of compression of the wire pieces near the working surface.

This object is achieved most successfully owing to the fact that in the specified tool the ratio of the length of the wire pieces in the set to their diameter is from 0.015 to 1.000 of the ratio of the modulus of elasticity of the wire material to its fatigue limit.

This object is also successfully achieved because the set of wires fastened and laterally compressed inclues, in addition to the cutting wires, shorter pieces of wire whose length decreases gradually from the working surface of the tool towards the sides of the wire set.

Thanks to this design, the tool proposed herein combines a high productivity of the machining process with a long service life, ensures removal of thin layers of materials (thinner than 1 mm.) especially of ductile materials, and ensures a pre-set degree of roughness of a machined surface.

Owing to the fact that this tool cuts off thin shavings, free of abrasive dust, this tool can be successfully used for producing micropowders.

Additionally, this design of the present tool ensures a high resistance to wear, and makes it possible to automate the entire process of machining.

Now the invention will be described in detail by way of example with reference to the sole figure of the accompanying drawing illustrating a side view of the tool, cut away partly.

The rotatable tool has a split body with parts 1 and 2 fastened to each other in such a manner that they accommodate a set of wire pieces 3 fastened to one another at one end while their other free ends serve as cutters and form the working surface A of the tool in the shape of a surface of revolution.

The ends of the wire pieces in the set are fastened together by welding and, according to the invention, they are pressed to against one another at their side surfaces while along the remaining length they are compressed laterally.

This lateral compression of the wire pieces 3 is achieved by means of a couple of rings 4 located at the sides of the wires and shaped as a truncated cone at the side directed to the wires; the rings are fastened to the set of wires by welding, cementing, etc.

These rings 4 ensure tight compression of the side surfaces of the wire piece ends in the set and the required density of the faces of their opposite ends forming the working surface A of the tool. Additionally, these rings 4 support the wire set on the body parts 1 and 2.

Experiments have shown, that it is practicable to use additional pairs of rings for lateral compression of the wire piece sets. This is achieved due to the fact that the component parts 1 and 2 of the body have, in turn, a pair of rings 5 the distance between which can be adjusted by bolts 6. By adjusting the distance between the rings, additional compression of the set of wire pieces is ensured.

Furthermore, there is one more pair of rings 7 installed around the periphery of the tool body and fastened with nuts 8 which can also adjust the degree of compression, that is, the density of the wire faces serving as cutters.

This, in turn, broadens the field of application of the tool enabling one tool to be used for machining materials with different mechanical properties.

Additionally, the adjustment of this compression prolongs the life of the tool. This occurs because, irrespective of the wear, that is shortening of the wire pieces 3, the initial density of the wire tips serving as cutters remains constant.

The life of the tool is still further prolonged if the ratio of the length of the wire pieces 3 to their diameter equals 0.015 to 1.000 of times ratio of the modulus of elasticity of the wire material to its fatigue limit.

This condition is especially vital for the surface machining of hard-to-machine materials, when it is required to remove surface layers thicker than 0.05 mm.

Quite important for increasing the wear resistance of the tool is the fact that the set of wire pieces 3 fastened together and compressed laterally includes, apart from the working pieces serving as cutters and forming the working surface A of the tool, shorter wire pieces forming sections B. The length of these shorter wire pieces diminishes gradually from the working surface A towards the sides of the set.

This precludes bending of the wires at the sides of the set during the operation.

Given below are some examples of experimental use of the above described tool.

EXAMPLE 1

The surface of hot-rolled alloy-steel strip was cleaned of scale with a tool containing wire pieces 3 of steel having a modulus of elasticity $E=20,000$ kg./mm.$^2$, a fatigue limit of 65 kg./mm.$^2$, a diameter of 0.2 mm., and a length of 50 mm.

The ratio of the wire length to its diameter was 0.8 of the ratio of the modulus of elasticity of the wire material to its fatigue limit, while the ratio of the sum of areas of the cutting tips of the wire pieces to the entire working surface A of the tool was 0.7.

After machining, the strip surface acquired a metallic lustre and its roughness was about 0.6–2 microns.

The life of this tool until completely worn was about 1000 hrs.

EXAMPLE 2

A decarburized layer of metal about 0.8 mm. thick was removed from the surface of rolled round stock with a tool containing steel wire pieces 3 with a modulus of elasticity $E=20,000$ kg./mm.$^2$ and a fatigue limit of 10 kg./mm.$^2$, a diameter of 0.9 mm., and a length of 75 mm. The ratio of the sum of face areas of the cutting tips of the wire pieces to the entire working surface A of the tool was about 0.4, while the ratio of the wire length to its diameter was 0.04 of the ratio of the modulus of elasticity of the wire material to its fatigue limit.

After machining with this tool, the surface of the round stock had no decarburized layer and the maximum size of the irregularities on the surface did not exceed 10 microns. The removed metal shavings were 0.7–1.2 mm. in size, they were free of foreign matter and were reused for melting steel.

EXAMPLE 3

Micropowders were made of an aluminum-magnesium alloy by the use of a tool according to the invention containing steel wire pieces 3 with a modulus of elasticity $E=20,000$ kg./mm.$^2$ and a fatigue limit of 65 kg./mm.$^2$, a diameter of 0.16 mm., and about 25 mm. long. The ratio of the sum of face areas of the cutting tips of the wire pieces to the entire working surface A of the tool was about 0.8 mm. while the ratio of the length of wires to their diameter was 0.5 of the ratio of the modulus of elasticity of the wire material to its fatigue limit.

By removing the surface layers of metal, this tool produced a micropowder with a grain size below 50 microns.

EXAMPLE 4

The outer surfaces of pipes were cleaned of scale and rust, and the required roughness of the surface was obtained by using the tool according to the invention, containing steel wire pieces 3 with a modulus of elasticity $E=20,000$ kg./mm.$^2$, a fatigue limit of 30 kg./mm.$^2$, a diameter of 0.5 mm. and a length of 65 mm. The ratio of the sum of face areas of the cutting tips of the wire pieces to the entire working surface A of the tool was about 0.2 mm., while the ratio of the wire length to its diameter was 0.1 of the ratio of the modulus of elasticity of the material to its fatigue limit.

Such a tool rotating at a speed of about 100 r.p.m. can be used for cleaning surfaces of pipes prior to applying a thin protective coating.

The tool used for this kind of work displayed a high stability and sufficient durability (about 1000 hr.).

EXAMPLE 5

A surface layer was removed from plastic plates with a tool containing, according to the invention, steel wire pieces 3 of 0.7 mm. diameter and 60 mm. long. The ratio of the sum of face areas of the cutting tips of the wire pieces to the entire working surface A of the tool was 0.7. The surfaces of the plastic plates had to be machined to a certain degree of roughness for subsequent application of a coating; to ensure better adhesion of this coating, the roughness of the surface was brought to 200 microns.

It should be understood that the realization of the invention shown in the drawing as well as its embodiment disclosed in the examples above are only possible preferable versions of the invention.

Individual elements of the invention can be realized in various shapes, dimensions and a variety of arrangements. For example, the parts shown in the drawing and described above may be replaced by equivalent parts, positions of individual parts may be changed and the individual elements of the invention may be used independently of the other elements. All this does not depart from the function or scope of the invention as defined below in the appended claims.

What I claim is:

1. A rotating cutting tool for surface machining of articles and materials and for making powders, said tool comprising cutters constituted by pieces of wire fastened together at one of the ends thereof while their other ends are free and form the working surface of the tool in the shape of a surface of revolution, said wire pieces being pressed against each other at the fastened ends along their side surfaces while on the remaining length these wire pieces are compressed laterally so that the ratio of the sum of face areas of the cutting tips of the wire to the entire area of the working surface ranges from 0.10 to 0.93.

2. A rotating cutting tool according to claim 1, comprising rings for effecting lateral compression of the wire pieces, said rings being located at the sides of the wire set and having the form of a truncated cone at the side directed to the wires.

3. A rotating cutting tool according to claim 2, comprising at least two more pairs of rings for effecting additional lateral compression of the set of wires, said at least two more pairs of rings being of different diameters and installed so that they can be moved closer to each other to adjust the degree of compression.

4. A rotating cutting tool according to claim 1, wherein the ratio of the length of the wire pieces in the set to their diameter is from 0.015 to 1.000 of times the ratio of the modulus of elasticity of the wire material to its fatigue limit.

5. A rotating cutting tool according to claim 1, wherein the set of wire pieces includes on the sides, in addition to the wires serving as cutters, shorter pieces of wire whose length diminishes gradually from the working surface of the tool towards the sides of the wire set.

References Cited

UNITED STATES PATENTS

| | | | |
|---|---|---|---|
| 1,039,487 | 9/1912 | Casebolt | 29—105 |
| 1,604,142 | 10/1926 | Andreas | 29—105 |
| 2,079,995 | 5/1937 | Hodgkins | 29—105X |
| 2,164,620 | 7/1939 | Parish | 29—105 |
| 2,930,110 | 3/1960 | Glodde | 29—105 |
| 3,106,011 | 10/1963 | Clifton | 29—105 |

HARRISON L. HINSON, Primary Examiner

U.S. Cl. X.R.

29—78